United States Patent
Panchbhai et al.

(10) Patent No.: US 10,280,908 B2
(45) Date of Patent: May 7, 2019

(54) SYSTEMS AND METHODS FOR DETECTING PUMP-OFF CONDITIONS AND CONTROLLING A MOTOR TO PREVENT FLUID POUND

(71) Applicants: Saylee P. Panchbhai, Houston, TX (US); Kurtis Kandel, Louisville, OH (US)

(72) Inventors: Saylee P. Panchbhai, Houston, TX (US); Kurtis Kandel, Louisville, OH (US)

(73) Assignee: Baker Hughes Incorporated, Houston, TX (US)

( * ) Notice: Subject to any disclaimer, the term of this patent is extended or adjusted under 35 U.S.C. 154(b) by 180 days.

(21) Appl. No.: 15/357,427

(22) Filed: Nov. 21, 2016

(65) Prior Publication Data
US 2017/0145995 A1 May 25, 2017

Related U.S. Application Data

(60) Provisional application No. 62/257,861, filed on Nov. 20, 2015.

(51) Int. Cl.
| | |
|---|---|
| *E21B 47/008* | (2012.01) |
| *F04B 17/03* | (2006.01) |
| *E21B 43/12* | (2006.01) |
| *E21B 47/00* | (2012.01) |
| *F04B 19/22* | (2006.01) |

(Continued)

(52) U.S. Cl.
CPC ............ *F04B 17/03* (2013.01); *E21B 43/128* (2013.01); *E21B 47/0007* (2013.01); *F04B 19/22* (2013.01); *F04B 47/06* (2013.01); *F04B 49/065* (2013.01); *F04B 51/00* (2013.01); *H02P 6/006* (2013.01); *H02P 6/08* (2013.01);
(Continued)

(58) Field of Classification Search
CPC ............... E21B 43/128; E21B 47/0007; E21B 47/0008; E21B 47/04; E21B 47/042; F04B 17/03; F04B 51/00; F04B 49/065; F04B 19/22; F04B 2203/0401; H02P 25/064; H02P 21/00; H02P 6/006; H02P 6/08
See application file for complete search history.

(56) References Cited

U.S. PATENT DOCUMENTS

| | | | |
|---|---|---|---|
| 3,851,995 A | 12/1974 | Mills | |
| 3,953,777 A * | 4/1976 | McKee | ............... E21B 47/0008 318/455 |

(Continued)

*Primary Examiner* — Brad Harcourt
(74) *Attorney, Agent, or Firm* — Sprinkle IP Law Group (57) ABSTRACT

Systems and methods for determining the existence of a pump-off condition in an ESP system and controlling the motor to prevent fluid pound that would otherwise result from the pump-off condition. The current drawn by the ESP motor during a power stroke is monitored and the instantaneous force generated by the motor is determined from the instantaneous current. Pump-off conditions may be indicated by sudden, large decreases in the generated force, smaller decreases in force that occur over a longer period, or forces below those seen during a dwell time. In response to detecting a pump-off condition, the motor may be stepped through the rest of the stroke, temporarily halted and re-initialized, thereby preventing potentially damaging fluid pound that would otherwise result from the pump-off condition.

15 Claims, 6 Drawing Sheets

(51) Int. Cl.
*F04B 47/06* (2006.01)
*H02P 6/00* (2016.01)
*H02P 6/08* (2016.01)
*F04B 49/06* (2006.01)
*F04B 51/00* (2006.01)
*H02P 21/00* (2016.01)
*H02P 25/064* (2016.01)

(52) U.S. Cl.
CPC ............ *H02P 21/00* (2013.01); *H02P 25/064* (2016.02); *F04B 2203/0401* (2013.01)

(56) References Cited

U.S. PATENT DOCUMENTS

| | | | |
|---|---|---|---|
| 4,507,053 A | 3/1985 | Frizzell | |
| 5,252,031 A | 10/1993 | Gibbs | |
| 2010/0116508 A1* | 5/2010 | Oglesby | E21B 43/128 |
| | | | 166/369 |
| 2017/0002636 A1* | 1/2017 | Williams | E21B 43/127 |

* cited by examiner

SYSTEMS AND METHODS FOR DETECTING PUMP-OFF CONDITIONS AND CONTROLLING A MOTOR TO PREVENT FLUID POUND

CROSS-REFERENCE TO RELATED APPLICATIONS

This application claims the benefit of U.S. Provisional Patent Application 62/257,861, filed Nov. 20, 2015 by Saylee P. Panchbhai, et al., which is incorporated by reference as if set forth herein in its entirety.

BACKGROUND

Field of the Invention

The invention relates generally to linear permanent magnet motors, and more particularly the means for monitoring the force produced by a linear permanent magnet motor, determining the existence of a pump-off condition, and controlling the motor to prevent fluid pound resulting from pump-off.

Related Art

In the production of oil from wells, it is often necessary to use an artificial lift system to maintain the flow of oil. Artificial lift systems may utilize various types of pumps to lift oil out of the well. For instance, some conventional installations use rod lift systems in which a surface motor moves a sucker rod up and down in a reciprocating motion to drive a linear pump in the well. Other installations use electric submersible pumps (ESP's) in which a motor and a pump are positioned downhole in the well to pump oil out of the well.

In an artificial lift system that uses a linear permanent magnet motor to lift oil from the well, it may be useful to be able to determine the amount of force that would be produced by the system. This information may be used, for example, to adjust the speed at which the system's motor is operated. The amount of force being produced by the motor may also be used to determine whether the pump has encountered a gas pocket, or is approaching a pump-off state. Pump-off occurs due to a change in the fluid volume of the well under operation. This change in the fluid volume of the well is a natural phenomenon, and may occur due to several reasons, such as a change in the reservoir level, artificial stimulation of the well for a long time, etc. During pump-off, most of the fluid column could be filled with gas rather than liquid/oil. Under these circumstances, the mover may encounter sections of empty space/gas pockets through which it will act as a free-falling body before it encounters any fluid, which will occur with a greater-than-expected pound or force. The sudden, dramatic change in the forces/load within a stroke (referred to as fluid pound) may cause tremendous stresses on the ESP string, and may also damage the motor or shorten its useful life.

In a traditional pump system that uses a sucker rod, it is necessary to incorporate a strain gauge or some other type of load cell into the system to measure the pumping force. This load measuring component of the system requires a force measurement device, along with a physical assembly on the sucker rod pump. This makes the entire system more bulky and expensive.

It would therefore be desirable to provide systems and methods for determining the force generated by an ESP that is operated by a linear permanent magnet motor, detecting pump-off conditions based on the force, and controlling the motor to prevent fluid pound that may result from pump-off.

SUMMARY OF THE INVENTION

This disclosure is directed to systems and methods for determining the existence of a pump-off condition in an ESP system by monitoring the current drawn by the ESP motor, determining the instantaneous force generated by the motor and detecting a pump-off condition based on relatively sudden decreases in the generated force. The motor is then controlled to prevent fluid pound that would normally result from the pump-off condition.

One embodiment is an ESP system installed in a well. The system includes an electric drive positioned at the surface of the well and a power cable coupled between the electric drive and the ESP. The electric drive has current sensors installed at its output to measure the current of each phase of the AC output power provided to the ESP's linear motor. The drive includes a controller that receives instantaneous current measurements from the current sensors and determines an instantaneous current vector for each of the phases of the output power. The controller then determines an instantaneous force generated by the motor based on the instantaneous current vectors. For example, the controller may determine the instantaneous force by computing the root-mean-square of the instantaneous current vectors and multiplying this by a constant power factor.

During the power stroke of the linear motor, the controller calculates the instantaneous force at each of a plurality of points in time, and determines whether a pump-off condition exists. In response to determining that the pump-off condition exists, the controller re-initializes the linear motor. In one embodiment, the controller determines whether the pump-off condition exists by determining whether the instantaneous force at the corresponding point in time is less than a predetermined threshold (e.g., 35% of the instantaneous force generated by the motor at the preceding point in time). A pump-off condition may also be determined to exist when the instantaneous force is between the first threshold force and a slightly higher threshold (e.g., 75% of the instantaneous force generated by the motor at the preceding point in time), where the motor is not in an acceleration phase of the power stroke. If the instantaneous force is between these thresholds and the motor is not in an acceleration phase, the controller may increment a low-force violations counter and re-initialize the linear motor if the low-force violations counter reaches a threshold count. The controller may alternatively determine that there is a pump-off condition if the instantaneous force generated by the motor in an acceleration phase is less than a minimum force recorded during a dwell time of the motor. When the controller re-initializes the motor, it may step the linear motor through a remainder of the power stroke in a controlled mode prior to re-initializing the motor. The controller may position the motor at the end of the power stroke and delay for a predetermined amount of time at the end of the power stroke (e.g., several times the normal dwell time) prior to beginning re-initialization of the motor.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for preventing fluid pound in an ESP system that uses a linear permanent magnet motor and a reciprocating pump. This involves determining the force generated by the motor at a given point in time based on instantaneous current vectors of the power supplied to the motor, comparing the force at two or more points in the motor's power stroke to determine changes that indicate pump-off conditions, and controlling the motor in response to detecting the pump-off conditions so that fluid pound is avoided.

In one embodiment, the motor is driven by three-phase power received from a drive system at the surface of the well. The drive system monitors the current that is drawn by the motor. Instantaneous current values for each of the three phases are determined using analog-to-digital converters (ADC's), and the square root is taken of the sum of the squares of these instantaneous phase currents, divided by three. This produces an instantaneous current vector (ICV) which is multiplied by a constant force factor associated with the motor under consideration to produce an instantaneous force value. The force can be determined in this manner for any point in time and, in this embodiment, is computed at each transition of the Hall sensor signal received from the motor. Force determinations for successive transitions of the Hall signal are compared to determine whether the force drops by more than a predetermined percentage (e.g., 65 percent). If such a drop in the force is detected in combination with the position of the mover within the stroke, this could indicate a pump-off condition, and the motor is operated in a controlled mode (e.g., the mover is stepped downward at a reduced speed instead of being automatically commutated) to prevent the mover and/or pump from being driven at high speed into contact with the liquid and/or a hard stop, thus avoiding fluid pound.

The present systems and methods for detecting pump-off and preventing fluid pound have a number of advantages over the prior art. For instance, these systems and methods do not require the physical load sensors or other physical assembly needed in traditional sucker rod systems. The present systems and methods are therefore simpler and less costly than traditional sucker rod systems. The present systems and methods can be implemented in the electric drive systems and the methods can be carried out by the drive's control system without human intervention. The methods can therefore be performed more quickly and efficiently than conventional methods.

Figure 1:
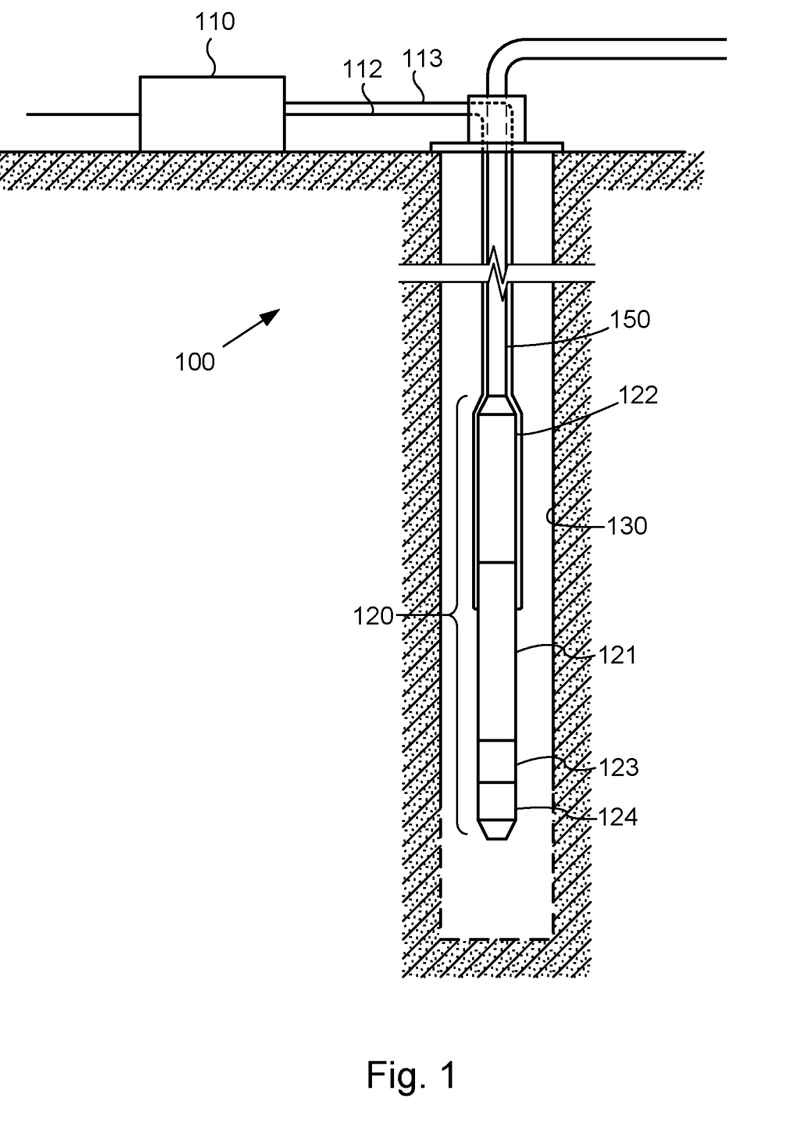
FIG. 1 is a diagram illustrating an exemplary pump system in accordance with one embodiment.

Referring to FIG. 1, a diagram illustrating an exemplary pump system 100 in accordance with one embodiment of the present invention is shown. A wellbore 130 is drilled into an oil-bearing geological structure and is cased. The casing within wellbore 130 is perforated in a producing region of the well to allow oil to flow from the formation into the well. Pump system 120 is positioned in the producing region of the well. Pump system 120 is coupled to production tubing 150, through which the system pumps oil out of the well. A control system 110 is positioned at the surface of the well. Control system 110 is coupled to pump 120 by power cable 112 and a set of electrical data lines 113 that may carry various types of sensed data and control information between the downhole pump system and the surface control equipment. Power cable 112 and electrical lines 113 run down the wellbore along tubing string 150.

Pump 120 includes an electric motor section 121 and a pump section 122. In this embodiment, an expansion chamber 123 and a gauge package 124 are included in the system. (Pump system 120 may include various other components which will not be described in detail here because they are well known in the art and are not important to a discussion of the invention.) Motor section 121 receives power from control system 110 and drives pump section 122, which pumps the oil through the production tubing and out of the well.

In this embodiment, motor section 121 is a linear permanent magnet motor. Control system 110 receives AC (alternating current) input power from an external source such as a generator (not shown in the figure), rectifies the AC input power and then converts the DC (direct current) power to produce three-phase AC output power which is suitable to drive the linear motor in a controlled manner. The output power generated by control system 110 is dependent in part upon the position of the mover within the stator of the linear motor. Position sensors in the motor sense the position of the mover and communicate this information via electrical lines 113 to control system 110 so that the mover will be driven in the proper direction (as will be discussed in more detail below). The output power generated by control system 110 is provided to pump system 120 via power cable 112.

Figure 2:
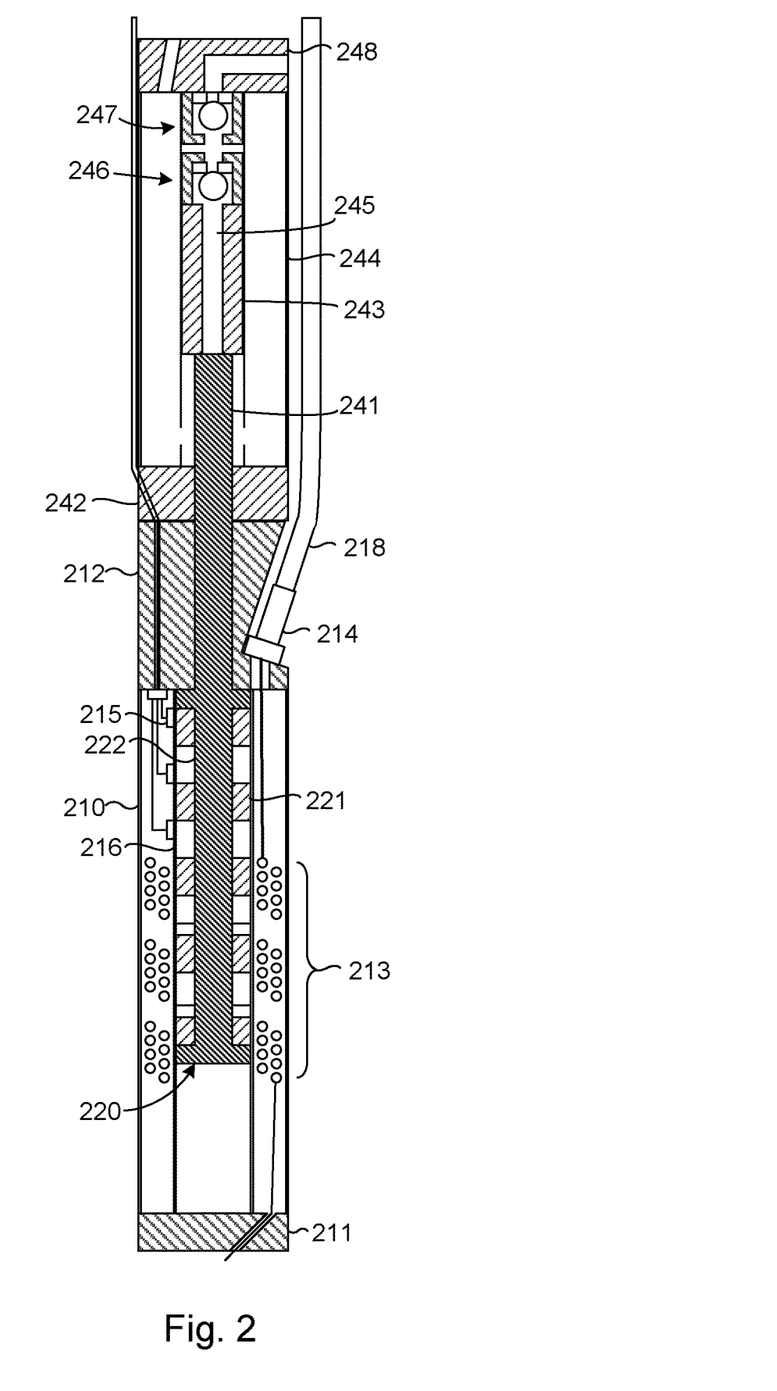
FIG. 2 is a diagram illustrating an exemplary linear motor in accordance with one embodiment which would be suitable for use in the pump system of FIG. 1.

Referring to FIG. 2, a diagram illustrating an exemplary linear motor and pump which would be suitable for use in the system of FIG. 1 is shown. It should be noted that alternative embodiments may use different designs for the motor and pump. In this embodiment, linear motor 200 has a cylindrical stator 210 which has a bore in its center. A base 211 is connected to the lower end of stator 210 to enclose the lower end of the bore, and a head 212 is connected to the upper end of the stator. Motor head 212 has an aperture therethrough to allow the shaft 222 of the mover 220 to extend to the pump 240. In this embodiment, the pump is configured to draw fluid into the pump on the upstroke and expel the fluid on the downstroke. In other words, the downstroke is the power stroke and the upstroke is the return stroke.

Stator 210 has several coils (e.g., 213) of electrically conductive magnet wire that are positioned around an inner support core 216 that forms the bore of the stator. The coils form multiple poles within the stator. The number of coils and the number of poles may vary from one embodiment to another. The ends of the windings are coupled (e.g., via a pothead connector 214) to the conductors of the power cable 218. Although the power cable has separate conductors that carry the power to the motor, the conductors are not depicted separately in the figure for purposes of simplicity and clarity.

The windings are alternately energized by the current received through the power cable to generate magnetic fields within the stator. These magnetic fields interact with permanent magnets 221 on the shaft 222 of mover 220, causing mover 220 to move up and down within the motor. The waveform of the signal provided by the drive via the power cable is controlled to drive mover 220 in a reciprocating motion within the bore of stator 210. Stator 210 may incorporate one or more Hall-effect sensors 215 to monitor the electrical position of mover 220 within stator 210.

Pump 240 is a plunger-type reciprocating pump that is driven by motor 200. The pump has a base 242 that is secured to the head 212 of the motor. Pump base 242 is connected to the lower end of an outer housing 244, and a pump head 248 is connected to the upper end of the housing. An inner pump barrel 245 is positioned within outer housing 244. A connecting rod 241 extends from mover 220 through the pump base 242, into inner barrel 245. A plunger 243 is connected to the upper end of the connecting rod. Plunger 243 has a traveling valve 246 that opens when the plunger travels upward and closes when the plunger travels downward. A standing valve 247 opens when the plunger travels downward and closes when the plunger travels upward.

Figure 3:
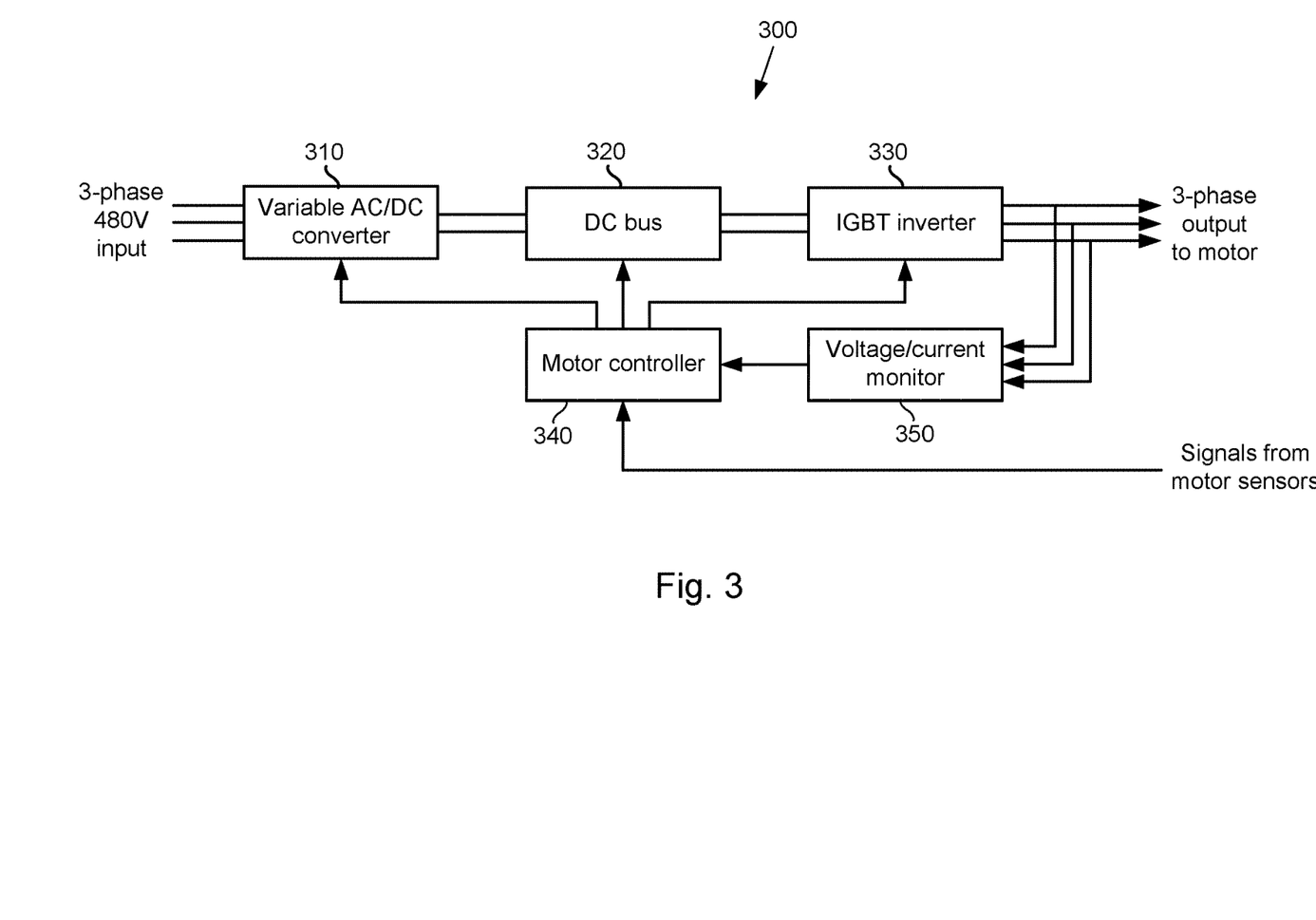
FIG. 3 is a functional block diagram illustrating the structure of a control system for a linear motor in accordance with one embodiment.

Referring to FIG. 3, a functional block diagram illustrating the structure of a control system for a linear motor in one embodiment is shown. The control system is incorporated into a drive system for the linear motor. The drive system receives AC input power from an external source and generates three-phase output AC power that is provided to the linear motor. The drive system also monitors the current drawn by the motor and uses instantaneous current vectors to determine the instantaneous force generated by the motor. If the instantaneous force indicates that a fluid pound condition exists, the controller changes the commutation pattern of the motor to a more controlled one, thus affecting the normal operation of the motor (e.g., stepping the motor through the power stroke).

As depicted in FIG. 3, drive system 300 has a variable AC/DC converter that receives AC input power from an external power source. The input power may be, for example, 480V, three-phase power. Circuitry 310 converts the received AC power to DC power and stores this power in a DC bus 320. The DC power is provided as an input to the inverter section 330 which may use, for example IGBT switches to produce three-phase output power at a desired voltage and frequency. The output power produced by inverter 330 is transmitted to the downhole linear motor via a power cable.

The power output by inverter 330 is monitored by voltage and current sensors 350 installed on the output of the drive. Sensors 350 provide a signal which indicates the current drawn by the linear motor as an input to motor controller 340. Motor controller 340 may also receive information from the downhole linear motor (e.g., position signals from Hall sensors in the motor) and/or other equipment positioned in the well. This information may be provided to an operator, as well as being used by motor controller 340 to control the output power that is generated by drive system 300.

Motor controller 340 is configured to make a determination of the instantaneous force that is being produced by the motor. The force can be determined at any point in time. Force determinations can be made repeatedly, and at very short intervals. In one embodiment, the force is determined at each transition of the Hall signal, although it can be determined at other points in time as well. In the present system, the force values computed for successive Hall transitions are compared to each other to determine whether the force drops/rises unexpectedly. For example, although there may be some relatively small variations in the force generated by the motor over the power stroke as fluid is forced by the pump up the well, a sudden, relatively large drop in the force indicates that the pump is not completely filled with fluid, thus reducing the production rate (i.e., a pump-off condition exists). In response to detecting a large drop in the computed force, the motor controller begins a controlled mode of operation (e.g., stepping the motor through the power stroke) in order to prevent fluid pound and the damage that may result from fluid pound, along with position loss.

Figure 4:
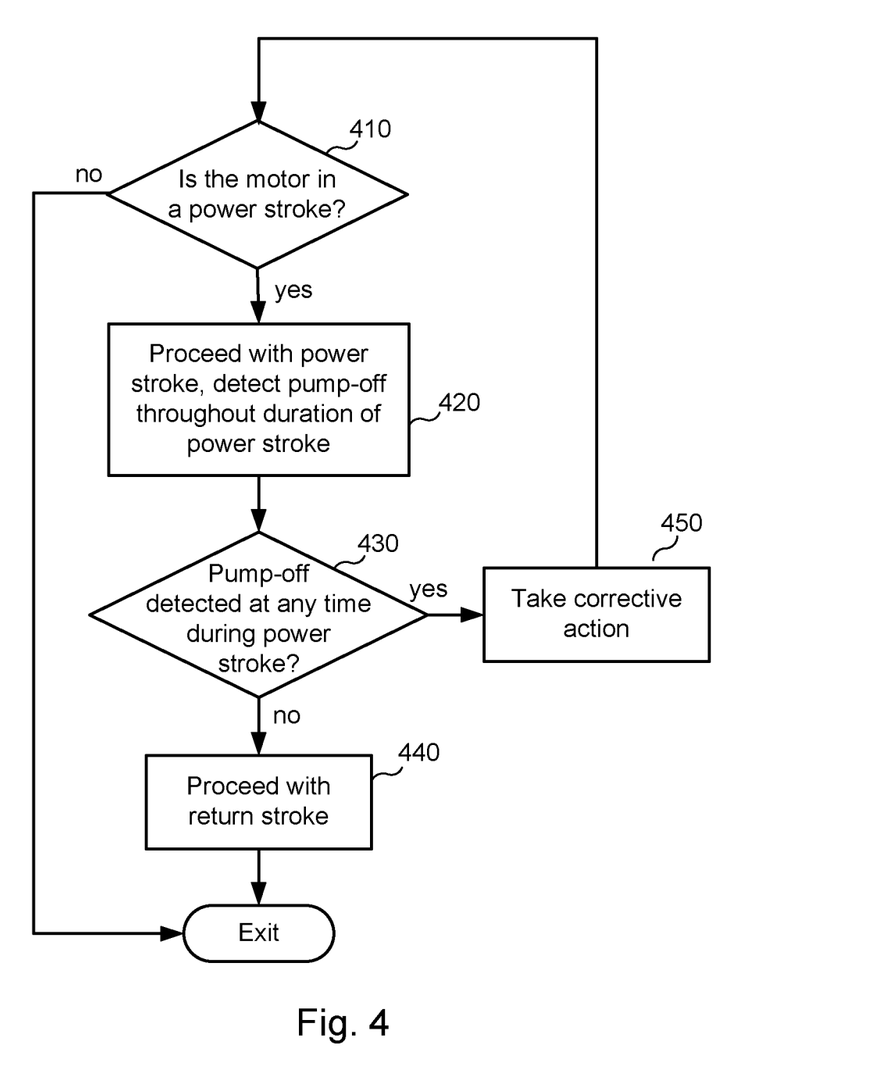
FIG. 4 is a flow diagram illustrating a method for detecting pump-off conditions in an ESP and controlling the ESP motor to avoid fluid pound in accordance with one embodiment.

Referring to FIG. 4, a flow diagram illustrating, at a very high level, the operation of the controller with respect to the detection of pump-off in one embodiment is shown. A more detailed flow diagram for this process is illustrated in FIGS. 5A and 5B.

As depicted in FIG. 4, the pump-off conditions are only detected on the power stroke. During the return stroke, there is no risk of damage from fluid pound. The process therefore begins with a determination of whether the motor is in a power stroke/load bearing stroke (410). During the power stroke, the controller monitors the force produced by the motor and, based upon the force, determines whether a pump-off condition exists (430). This occurs at multiple points in the power stroke. If no pump-off condition is identified, the motor completes the power stroke and continues to the return stroke (440). If a pump-off condition is identified by the controller, it re-initializes the motor (450). After the motor is re-initialized, the operation of the motor is resumed, with the force generated by the motor during power strokes being monitored to detect pump-off conditions.

Figure 5A:
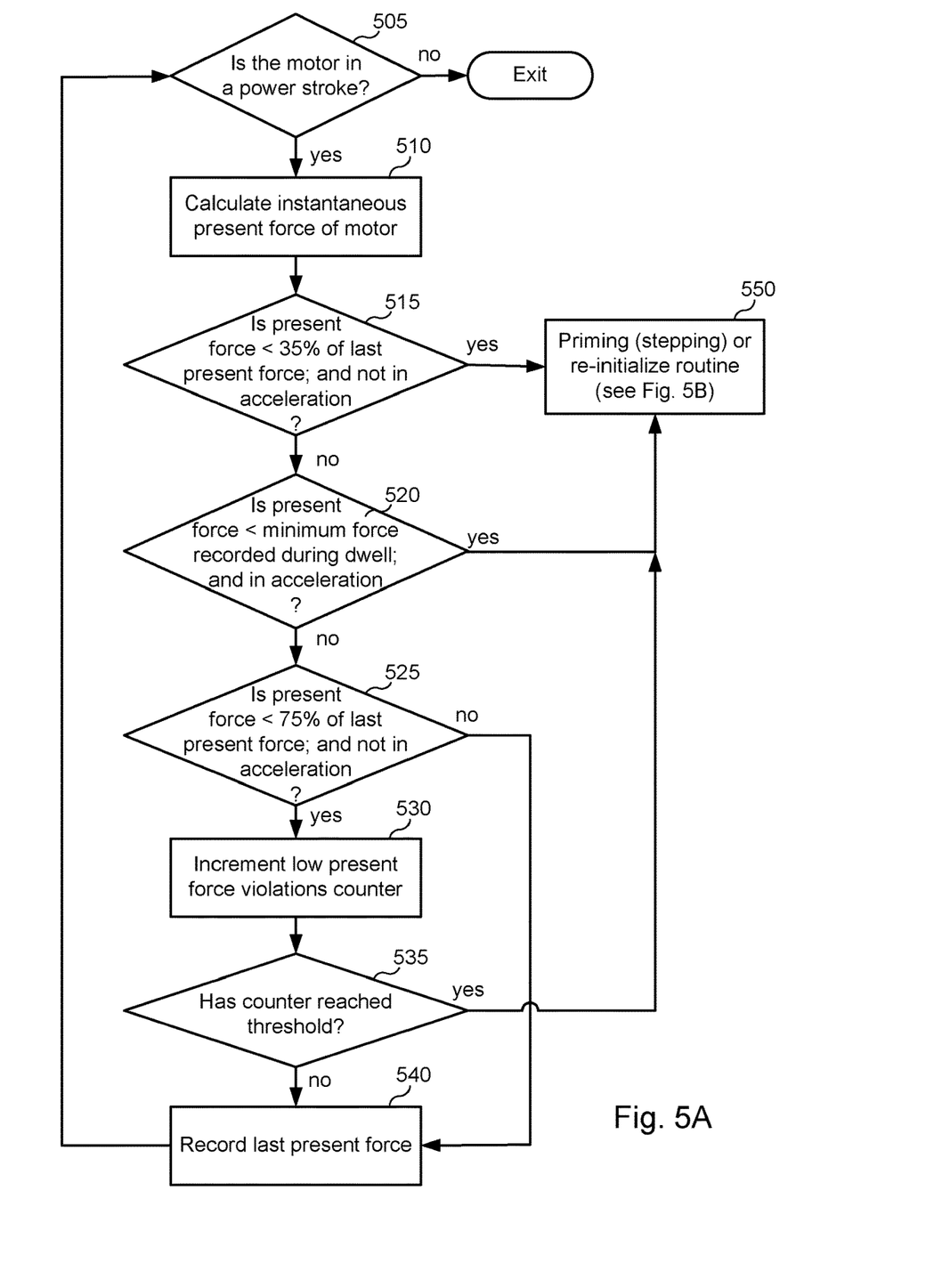
FIGS. 5A and 5B are flow diagrams illustrating in more detail the method of FIG. 4.
Figure 5B:
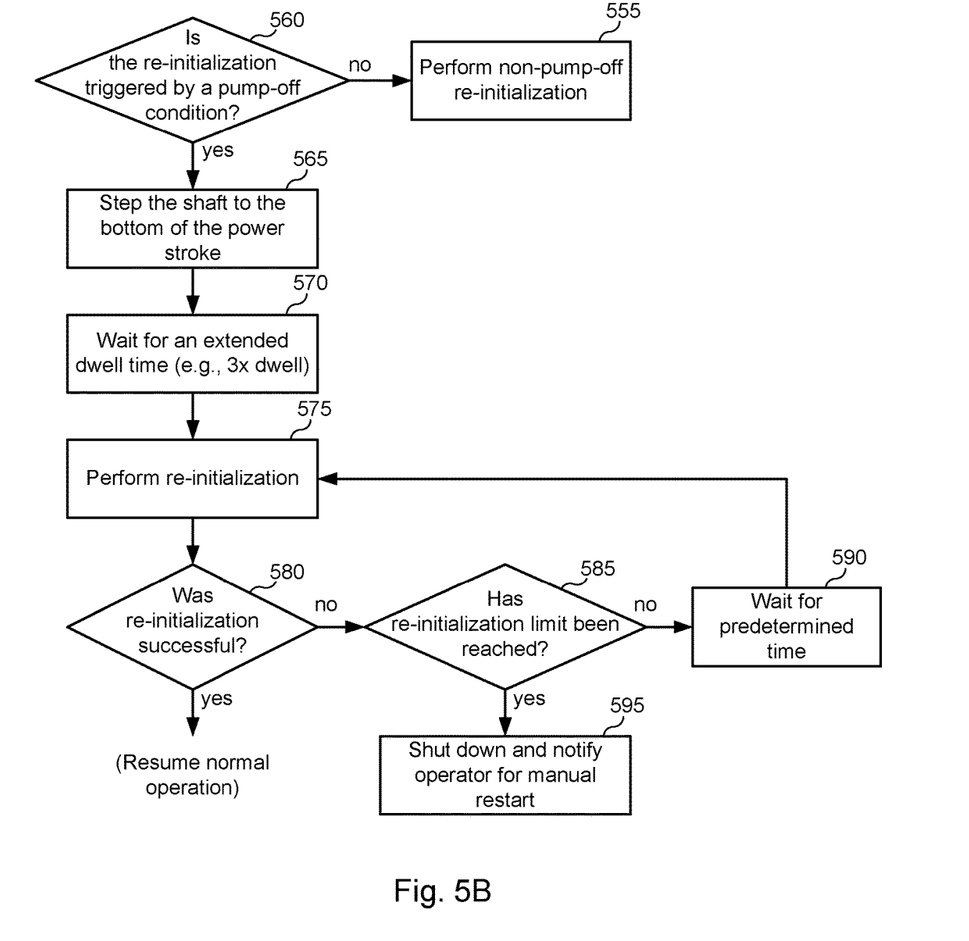

Referring to FIGS. 5A and 5B, the process of detecting pump-off in the power stroke of a motor in one embodiment is shown in more detail. FIG. 5A illustrates the detection of a pump-off condition, while FIG. 5B illustrates the re-initialization that is triggered by detection of the pump-off condition.

Referring to FIG. 5A, the process begins with a determination of whether the motor is in a power stroke (505). As noted above, pump-off detection occurs only in the power stroke, and not in the return stroke. If the motor is not in a power stroke, the procedure is exited. If the motor is in a power stroke, the controller calculates the force currently being generated by the motor (510). In this embodiment, the controller receives a combined Hall signal from the motor, and the force is computed each time there is a transition in the Hall signal, which equates to regular intervals of the travel of the mover. In other embodiments, the force may be computed at different times or intervals, or in response to different signals.

In this embodiment, the controller monitors the current drawn by the linear motor. The controller obtains instantaneous current values for each of the three phases of the output power and computes the root-mean-square of these instantaneous current values, as shown in equation 1 below.

$$ICV = \sqrt{\frac{(Ainst)^2 + (Binst)^2 + (Cinst)^2}{3}} \quad (1)$$

where:
ICV=instantaneous current vector;
$A_{inst}$=instantaneous phase current for phase A;
$B_{inst}$=instantaneous phase current for phase B;
$C_{inst}$=instantaneous phase current for phase C.

The root-mean-square is then multiplied by a constant force factor to produce the instantaneous force generated by the linear motor. This is shown in equation 2 below.

$$\text{Force} = K_f * ICV \quad (2)$$

where:
$K_f$=constant force factor (or motor constant).

Each time the instantaneous force produced by the motor (the present force) is computed, it is stored so that it can be compared with the next present force value. The change in the computed present force from one Hall transition to the next is used to determine whether a pump-off/fluid pound condition exists. This is achieved by the application of several tests. First, it is determined whether the current present force value is less than a predetermined percentage of the last present force value, and the mover is not in an acceleration phase (515). In this case, this lower threshold is 35%. If the computed present force value is less than 35% of the last present force value, the force has dropped by a very significant amount (about two thirds or more), which indicates that the pump is not pushing liquid, but has instead encountered an empty column filled with gas—a pump-off condition. If the force drops this much, the controller begins a priming routine (550). This routine may, for example, step the mover down through the remainder of the power stroke, wait for the fluid column to fill or the gas to clear, and re-initialize the motor, as will be discussed in more detail below in connection with FIG. 5B.

As noted above, the test of step 515 takes into account whether the motor is in an acceleration phase. This is because, during acceleration, the motor may generate much higher forces than it does through the remainder of the power stroke. The controller therefore allows the motor to complete the acceleration phase before comparing computed present force values. The controller does, however, compare the computed present force value to a minimum force that is measured during the dwell times of the motor (520) during the acceleration phase. The dwell times are the times at the ends of each stroke, during which the direction of the mover is reversed. If the present force during acceleration is less than this minimum force, then a fluid pound condition is deemed to exist, and the controller begins the priming/re-initialization routine (550).

The controller can also detect pump-off conditions that are less severe than those described above. For example, in step 525, if the motor is not in an acceleration phase and the currently computed present force value drops to less than an upper threshold of 75% of the last present force value, but is not less than the first, lower threshold (35% in this example), the controller increments a counter (530). If the counter reaches or exceeds a predetermined number (535), then the controller will begin the priming/re-initialization routine (550). If the counter has not yet reaches the predetermined number, then the controller updates the last present force value with the current present force value (540) and continues to monitor the force generated by the motor.

It should also be noted that if none of the pump-off tests triggers the re-initialization routine, the controller updates the last present force value with the current present force value (540) and continues to monitor the motor's force while the motor is in the power stroke.

Referring to FIG. 5B, a flow chart illustrating an exemplary re-initialization routine is shown. In this example, the routine is tailored to re-initialize the system after detection of pump-off, so the controller first checks to determine whether the re-initialization has been triggered by a pump-off condition (560). If not, then the motor is re-initialized according to a non-pump-off routine (555). If the re-initialization has been triggered by a pump-off condition, the motor is stepped through the remainder of the power stroke (565). When it reaches the end of the stroke, rather than waiting for a normal dwell time, the controller keeps the motor at the end of its stroke for an extended dwell time (570). In one embodiment, the normal dwell time might be on the order of thousandths of a second, and the extended dwell time might be three or more times the normal dwell time (typically not exceeding one second). In an alternative embodiment, the controller may step the motor to the end of the return stroke and keep it there for an extended dwell time.

After the controller has waited for the extended dwell time, it re-initializes the motor (575). The controller then determines whether the re-initialization was successful (580). If so, the controller resumes the process of monitoring the force generated by the motor during power strokes and detecting pump-off conditions as shown, for example, in FIG. 5A. If the re-initialization was not successful, the controller determines whether a threshold number of re-initialization attempts have been made (585). For example, the controller may be limited to five attempts. If the threshold number has not been reached, the controller may wait for a predetermined amount of time (590) before again attempting re-initialization (575). If the threshold number of re-initialization attempts has been met, the controller notifies an operator (595) with a shutdown fault annunciation, and the operator can then manually restart the system.

The present systems and methods provide various advantages with respect to conventional techniques for identifying pump-off conditions in a pump system and controlling the system to prevent fluid pound. For instance, the present systems and methods do not require the strain gauges and pump assemblies that are necessary in traditional sucker pumps. Further, the ability to compute instantaneous force generated by the motor, and consequently changes in force that indicate pump-off conditions, is not found in conventional ESP systems. The present systems and methods may have other advantages as well.

The preceding description of the disclosed embodiments is provided to enable any person skilled in the art to make or use the present invention. Various modifications to these embodiments will be readily apparent to those skilled in the art. For instance, the functions described above in connection with the motor controller may be distributed among one or more other components of the drive system. Further, alternative embodiments may involve different steps to achieve the desired force-based pump-off detection, and may use different threshold force values, counter values, and so on. The generic principles defined herein may therefore be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

What is claimed is:

1. A system comprising:
an electric submersible pump (ESP) installed in a well;
an electric drive positioned at the surface of the well; and
a power cable coupled between the electric drive and the ESP;
wherein the electric drive includes one or more current sensors coupled to an output of the electric drive, wherein the sensors measure one or more currents of AC output power provided by the electric drive to a linear motor;
wherein the electric drive includes a controller that receives instantaneous current measurements from the current sensors, determines an instantaneous current vector for each of one or more phases of the AC output power based on the measured instantaneous currents, and determines an instantaneous force based on the instantaneous current vectors;
wherein during a power stroke of the linear motor, the controller calculates the instantaneous force generated by the motor at each of a plurality of points in time in dependence on the instantaneous current vectors at the corresponding points in time and for one or more of the points in time, wherein the controller determines whether a pump-off condition exists and re-initializes the linear motor in response to determining that the pump-off condition exists; wherein the controller determines whether the pump-off condition exists at the corresponding point in time by determining whether the instantaneous force generated by the motor at the corresponding point in time is less than a predetermined percentage of the instantaneous force generated by the motor at a preceding point in time; and
wherein the controller determines the instantaneous force for each point in time by measuring instantaneous current vectors of each of three phases of the output power for the corresponding point in time and computes the instantaneous force as a root-mean-square of the instantaneous current vectors multiplied by a constant power factor.

2. A method for controlling a linear motor, the method comprising:
driving a linear motor;
during a power stroke of the linear motor, measuring current drawn by the motor at each of a plurality of points in time and calculating an instantaneous force generated by the motor at each of the plurality of points in time in dependence on the corresponding current drawn by the motor;
at each of the points in time after a first one of the points in time, determining whether a pump-off condition exists, re-initializing the linear motor if the pump-off condition exists, and continuing to drive the linear motor if the pump-off condition does not exist; and
wherein determining whether the pump-off condition exists at the corresponding point in time includes determining whether the instantaneous force generated by the motor at the corresponding point in time is less than a predetermined percentage of the instantaneous force generated by the motor at a preceding point in time.

3. The method of claim 2, wherein determining the instantaneous force for each point in time includes measuring instantaneous current vectors of each of three phases of power drawn by the linear motor at the corresponding point in time and computing the instantaneous force as a root-mean-square of the instantaneous current vectors multiplied by a constant power factor.

4. The method of claim 2, wherein determining whether the pump-off condition exists at the corresponding point in time includes determining whether:
the instantaneous force generated by the motor at the corresponding point in time is less than 35% of the instantaneous force generated by the motor at the preceding point in time; and
the linear motor is not in an acceleration phase of the power stroke.

5. The method of claim 2, further comprising re-initializing the linear motor when the instantaneous force generated by the motor at the corresponding point in time in an acceleration phase of the linear motor is less than a minimum force recorded during a dwell time of the linear motor.

6. The method of claim 2, further comprising stepping the linear motor through a remainder of the power stroke in a controlled mode prior to re-initializing the linear motor.

7. The method of claim 2, further comprising, after determining that the pump-off condition exists, delaying for a predetermined amount of time prior to beginning re-initialization of the linear motor.

8. The method of claim 2, wherein determining whether the pump-off condition exists at the corresponding point in time includes:
determining whether the instantaneous force generated by the motor at the corresponding point in time is between 35% and 75% of the instantaneous force generated by the motor at the preceding point in time and the linear motor is not in an acceleration phase of the power stroke;
if the instantaneous force generated by the motor at the corresponding point in time is between 35% and 75% of the instantaneous force generated by the motor at the preceding point in time and the linear motor is not in an acceleration phase of the power stroke, incrementing a low-force violations counter and re-initializing the linear motor if the low-force violations counter reaches a threshold count.

9. A system comprising:
a linear motor; and
an electric drive coupled to provide output power to the linear motor, thereby driving the linear motor;
wherein the electric drive measures a current of the output power and, during a power stroke of the linear motor, calculates an instantaneous force generated by the motor at each of a plurality of points in time in dependence on the current drawn by the motor at the corresponding points in time;

wherein, for one or more of the points in time, the electric drive determines whether a pump-off condition exists and re-initializes the linear motor in response to determining that the pump-off condition exists; and wherein the electric drive determines whether the pump-off condition exists at the corresponding point in time by determining whether the instantaneous force generated by the motor at the corresponding point in time is less than a predetermined percentage of the instantaneous force generated by the motor at a preceding point in time.

10. The system of claim 9, wherein the electric drive determines the instantaneous force for each point in time by measuring instantaneous current vectors of each of three phases of the output power for the corresponding point in time and computes the instantaneous force as a root-mean-square of the instantaneous current vectors multiplied by a constant power factor.

11. The system of claim 9, wherein the electric drive determines whether the pump-off condition exists at the corresponding point in time by determining whether:

the instantaneous force generated by the motor at the corresponding point in time is less than 35% of the instantaneous force generated by the motor at the preceding point in time; and the linear motor is not in an acceleration phase of the power stroke.

12. The system of claim 9, wherein the electric drive re-initializes the linear motor when the instantaneous force generated by the motor at the corresponding point in time in an acceleration phase of the linear motor is less than a minimum force recorded during a dwell time of the linear motor.

13. The system of claim 9, wherein in response to determining that the pump-off condition exists, the electric drive steps the linear motor through a remainder of the power stroke in a controlled mode prior to re-initializing the linear motor.

14. The system of claim 9, wherein the electric drive, after determining that the pump-off condition exists, positions the motor at the end of the power stroke and delays for a predetermined amount of time at the end of the power stroke prior to beginning re-initialization of the linear motor.

15. The system of claim 9, wherein the electric drive determines whether the pump-off condition exists at the corresponding point in time by determining whether the instantaneous force generated by the motor at the corresponding point in time is between 35% and 75% of the instantaneous force generated by the motor at the preceding point in time and the linear motor is not in an acceleration phase of the power stroke; if the instantaneous force generated by the motor at the corresponding point in time is between 35% and 75% of the instantaneous force generated by the motor at the preceding point in time and the linear motor is not in an acceleration phase of the power stroke, the electric drive increments a low-force violations counter and re-initializes the linear motor if the low-force violations counter reaches a threshold count.

* * * * *